E. Y. WHITE.
MOTOR CYCLE FRAME.
APPLICATION FILED SEPT. 10, 1913.
1,152,773.   Patented Sept. 7, 1915.
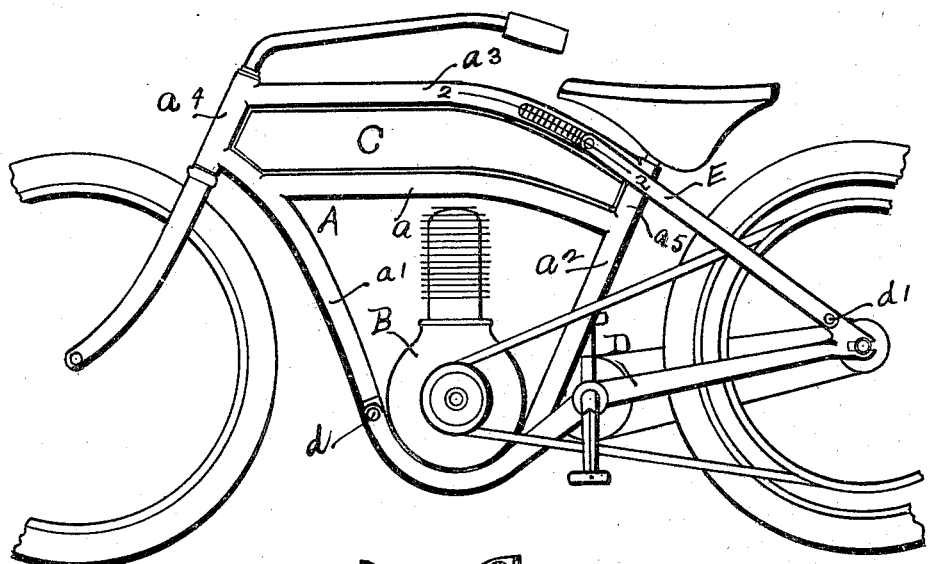
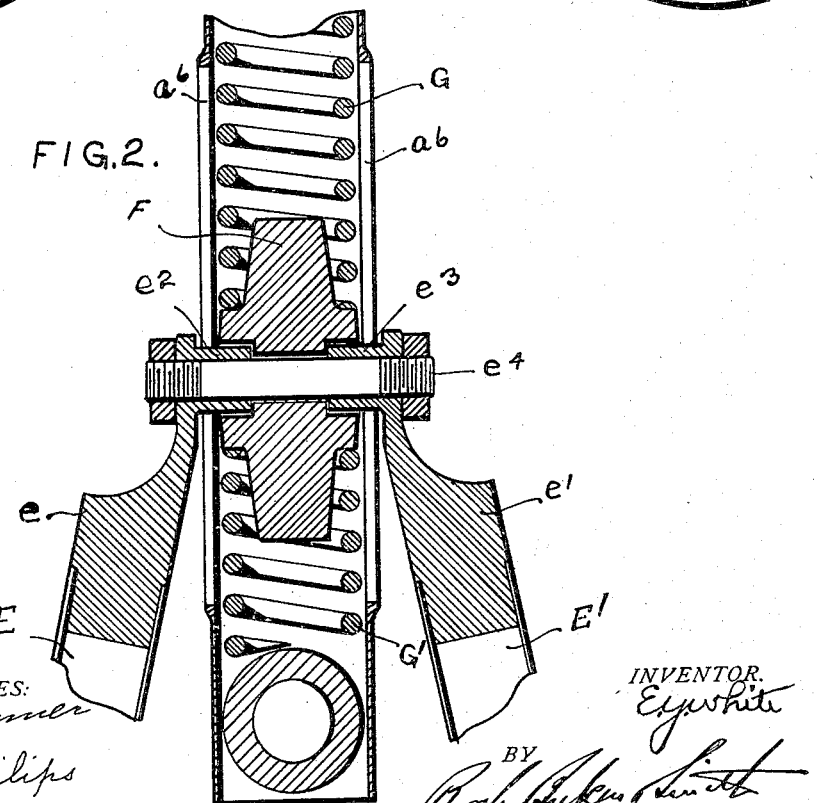

UNITED STATES PATENT OFFICE.

EDWARD YOUNG WHITE, OF SAN ANTONIO, TEXAS.

MOTOR-CYCLE FRAME.

1,152,773.   Specification of Letters Patent.   Patented Sept. 7, 1915.

Application filed September 10, 1913. Serial No. 789,154.

*To all whom it may concern:*

Be it known that I, EDWARD Y. WHITE, a citizen of the United States, residing at San Antonio, in the county of Bexar and State of Texas, have invented certain new and useful Improvements in Motor-Cycle Frames, of which the following is a specification.

My invention relates to certain new and useful improvements in motorcycle frames, and has for its purpose the hanging of the motor in a yielding frame adapted most advantageously to relieve it from danger of injury by jolting or jarring over a rough road.

To such end, it consists in certain novel features and characteristics which will be hereinafter fully described and claimed.

In the drawing: Figure 1 is a side elevation of a motorcycle embodying my invention, in its preferred form, and Fig. 2 is a cross-section on the line 2—2 of Fig. 1, showing the arrangement of the spring cushion in the upper frame member.

In the form here shown, the frame A has a lower approximately triangular portion made up of the three tubular members $a$, $a^1$, $a^2$, within which is supported the motor B. Above this triangular portion the four members $a$, $a^4$, $a^3$, $a^5$ inclose a space within which is arranged the fuel tank C. The upper member $a^3$, is preferably bent downward at its rear portion to bring it approximately in line with the rear axle.

The rear wheel frame D is pivoted to the main frame at $d$, and carries the rear wheel in the usual manner. At $d^1$ are pivoted the two rear braces or struts E, E$^1$, which extend forward and upward and terminate in ends $e$, $e^1$, having bosses $e^2$, $e^3$ extending through slots $a^6$, $a^6$, in the rear portion of the upper member $a^3$. Upon the inner portion of these bosses is hung a sliding block F, yieldingly held between two coiled springs G, G$^1$, confined under tension between suitable abutments within the upper frame member $a^3$. A bolt $e^4$ extending through the block and the bosses secures these parts together.

As the weight of the motor and the rider force down the middle portion of the frame, the block F slides forward, compressing the spring G, and upon the rebound the block is checked by the spring G$^1$.

It will be noticed that this construction makes a frame as graceful and compact as a rigid frame and yet affords all of the advantages of a spring frame.

I contemplate many variations in details of construction and arrangement of parts, and, therefore, do not limit myself to the specific structure shown as an embodiment of the invention.

I claim:

1. In a frame for bicycles, motorcycles, or the like, the combination of a main frame comprising an upper tube having its rear portion downwardly curved, a rear wheel frame pivotally connected to the main frame, a spring in the curved portion of said upper tube, a slider within the tube engaging the spring, and a connection between the slider and said articulated frame.

2. In a frame for bicycles, motorcycles, or the like, the combination of a main frame including an upper tube having a downwardly curved rear portion, a spring within said curved portion, a block engaged by the spring and slidable within said curved tube portion, a driving wheel frame pivoted to the main frame and a connection between said articulated frame and said block.

3. In a frame for bicycles, motorcycles, or the like, the combination of a main frame including an upper tube having a downwardly curved rear portion, a spring within said curved portion, a block engaged by the spring and slidable within said curved tube portion, rear braces pivoted to the main frame and carrying a drive wheel, a rear fork pivoted to the braces and a pivotal connection between the rear fork and said block.

4. In a frame for bicycles, motorcycles, or the like, the combination of a main frame including an upper tube having a downwardly curved rear portion, a spring within said curved portion, a block engaged by the spring and slidable within said curved tube portion, a driving wheel frame pivoted to the main frame, a connection between said wheel frame and said block, and a reaction spring interposed between said block, and an abutment within said tube.

5. In a frame for bicycles, motorcycles, or the like, the combination of a main frame including an upper tube having a downwardly curved rear portion, a spring within said curved portion, a block engaged by the spring and slidable within said curved tube portion, rear braces pivoted to the main frame and carrying a drive wheel, a rear fork pivoted to the braces, a pivotal connection between the rear fork and said block, and a reaction spring interposed between said block and an abutment within said tube.

6. In a frame for bicycles, motorcycles, or the like, the combination of a main frame, comprising an upper tube having a rear part curved downwardly providing a long curved inclosure, a spring therein, a block slidable within the curved portion of the tube and engaging against the spring, the tube being provided with lateral slots substantially coextensive with the travel of the block, rear braces pivoted to the main frame and carrying a drive wheel and rear fork members pivoted to the braces and also having a pivotal connection with said block through said slots.

7. In a frame for bicycles, motorcycles, or the like, the combination of a main frame comprising an upper tube having a rear part curved downwardly providing a long curved inclosure, a main spring therein, a block slidable within the curved portion of the tube and engaging against the spring, the tube being provided with lateral slots substantially coextensive with the travel of the block, a recoil spring within the tube and engaging the block, rear braces pivoted to the main frame and carrying a drive wheel, and rear fork members pivoted to the braces and also having a pivotal connection with said block through said slots.

EDWARD YOUNG WHITE.

Witnesses:
JAKE DAED,
G. W. BRENNER.

Copies of this patent may be obtained for five cents each, by addressing the "Commissioner of Patents, Washington, D. C."